US007792890B2

(12) United States Patent  
Bhavnani

(10) Patent No.: US 7,792,890 B2  
(45) Date of Patent: Sep. 7, 2010

(54) SELECTIVELY ATTACHABLE CALCULATOR

(76) Inventor: Dilip Bhavnani, Sun Coast Merchandise Corporation, 6315 Bandini Blvd., Commerce, CA (US) 90040

( * ) Notice: Subject to any disclaimer, the term of this patent is extended or adjusted under 35 U.S.C. 154(b) by 1052 days.

(21) Appl. No.: 11/465,889

(22) Filed: Aug. 21, 2006

(65) Prior Publication Data

US 2008/0126454 A1    May 29, 2008

(51) Int. Cl.  
*G06F 1/16* (2006.01)
(52) U.S. Cl. ...................................... 708/105
(58) Field of Classification Search ........................ None  
See application file for complete search history.

(56) References Cited

U.S. PATENT DOCUMENTS

| 4,801,059 | A | * | 1/1989 | Hayes | .................... | 224/240 |
| D502,497 | S | * | 3/2005 | Tien | .................... | D18/7 |
| 2003/0121965 | A1 | * | 7/2003 | Shevers, Jr. | ............... | 235/61 R |
| 2005/0182567 | A9 | * | 8/2005 | Cohen et al. | .................. | 702/19 |
| 2007/0022150 | A1 | * | 1/2007 | Bhavnani | .................... | 708/132 |
| 2007/0136405 | A1 | * | 6/2007 | Weinstein et al. | ........... | 708/130 |

OTHER PUBLICATIONS

U.S. Appl. No. 29/246,902, Dilip Bhavnani.  
"SWEDA 2005-2006 World of Gifts Catalog", 2005, cover page and p. 40, USA.

* cited by examiner

*Primary Examiner*—David H Malzahn

(57) ABSTRACT

A calculator that is selectively attachable to an article attached to a user of the calculator is disclosed. The calculator has an oblong carabiner extending from its bottom end for attaching the calculator to the article. The attachment mechanism includes an oblong loop and an arm that is part of the loop. The arm is rotatably attached to the loop so that the loop can be opened and closed to permit attachment to the article. The arm is biased to the closed position. The attachment mechanism is disposed so as to permit the user to read symbols on input buttons and an output display in the right-side-up position, while the calculator is attached to the user.

29 Claims, 3 Drawing Sheets

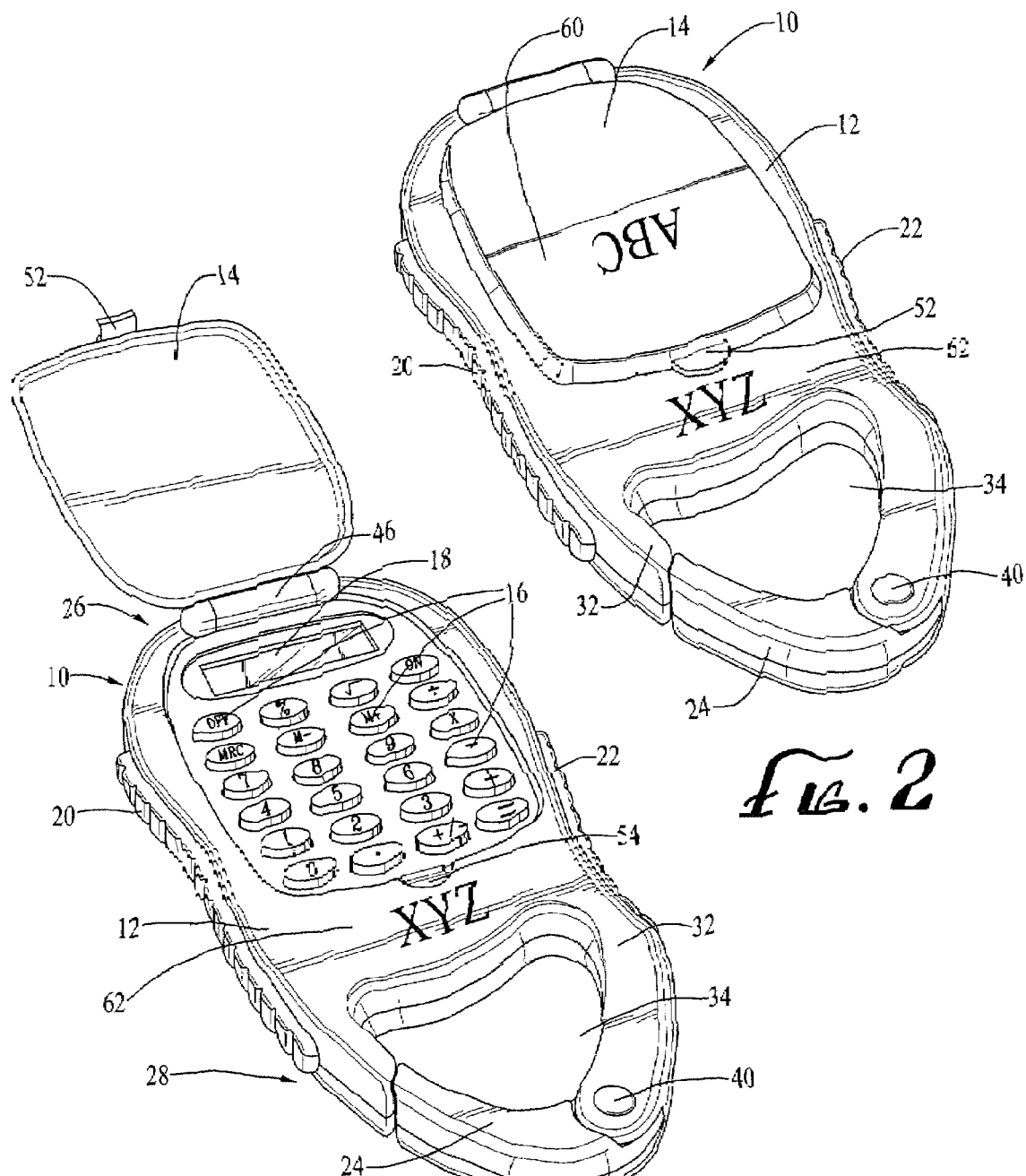

SELECTIVELY ATTACHABLE CALCULATOR

BACKGROUND OF THE INVENTION

The field of the present invention is calculators that attach to an article disposed on the user of the calculator.

People who use calculators often need their hands free when they perform tasks other than mathematical calculations. Calculator holders have been invented to meet this need. U.S. Pat. No. 4,801,059 to Hayes discloses such a device. Such holders require a substantial amount of material apart from the calculator itself. They therefore require elaborate means for attachment to a belt or some other article on the user's person. The holder is also typically difficult to attach to and detach from the aforementioned article. Finally, the calculator must be detached from the holder before the calculator can be used because the display would be upside down when attached to a persons belt.

Calculators embedded in watches have also been created. While watch calculators permit the user to carry the calculator with hands free, watch calculators are inconvenient and inefficient to use because the input elements are small and time-consuming to activate. In addition, watch calculators are not easily detached from the watch's band or strap.

A calculator with an integral means of selective attachment to an external article on the user's person, such as a belt, key ring or key chain, has been invented. U.S. Pat. No. D502,497 issued to Tien discloses such a calculator. However, this device does not allow comfortable use of the calculator while attached to the user.

There is thus a need for a calculator which can be readily attached to a user without a separate holder and can be used while attached so that the user can efficiently move from one place to another with hands free during repeated use of the calculator.

SUMMARY OF THE INVENTION

The present invention meets the need for such a device. According to the present invention, an attachment loop or ring, which can be readily and selectively attached to an external article attached to a person, is disposed on a bottom end of the calculator. The loop is disposed so that when the user accesses the calculator while attached, the user can read the numbers and other characters on the calculator input elements from a right-side-up orientation. Detachment of the calculator from the article during use is unnecessary.

The calculator can also have an output element which displays input information and the results of mathematical calculations. The output element can be an electronic display adjacent the input elements. The output element can also be arranged in the right-side-up orientation so that the display can be readily read by the user without detaching the calculator from the article.

The attachment mechanism can include an arm biased to form part of the loop for opening and closing the attachment mechanism. The arm can be configured to rotate about a pin attached to the loop to open and close the attachment mechanism.

A cover can be rotatably attached to the calculator casing to selectively cover at least the input elements when the calculator is not in use.

The present invention includes a calculator attachable to an external article attached to a user of the calculator. The calculator includes a calculator casing having a top end and an opposing bottom end. The calculator also includes electronic circuitry disposed inside the casing for computing mathematical calculations. Input elements may be embedded in the casing between the top and bottom ends, the input elements being electrically connected to the circuitry for inputting instructions to the circuitry when activated, the input elements having fixed input symbols disposed thereon. An output element may be embedded in the casing adjacent the input elements, the output element being electrically connected to the circuitry for displaying input information and the results of mathematical calculations. The output element may be adapted to display variable output symbols thereon. The calculator also includes an enclosable, rigid loop extending from the bottom end, the loop having an attachment mechanism for selectively attaching the calculator to the external article. The input elements, the fixed and variable symbols, and the output element are collectively oriented in a right-side-up orientation such that the fixed and variable symbols are readable by the user when the calculator hangs from the external article.

BRIEF DESCRIPTION OF DRAWINGS

FIG. 1 is a perspective view of a calculator according to the present invention with the calculator cover in the open position;

FIG. 2 is a perspective view of the calculator of FIG. 1 with the cover in the closed position;

DETAILED DESCRIPTION OF THE PREFERRED EMBODIMENT

Figure 3:
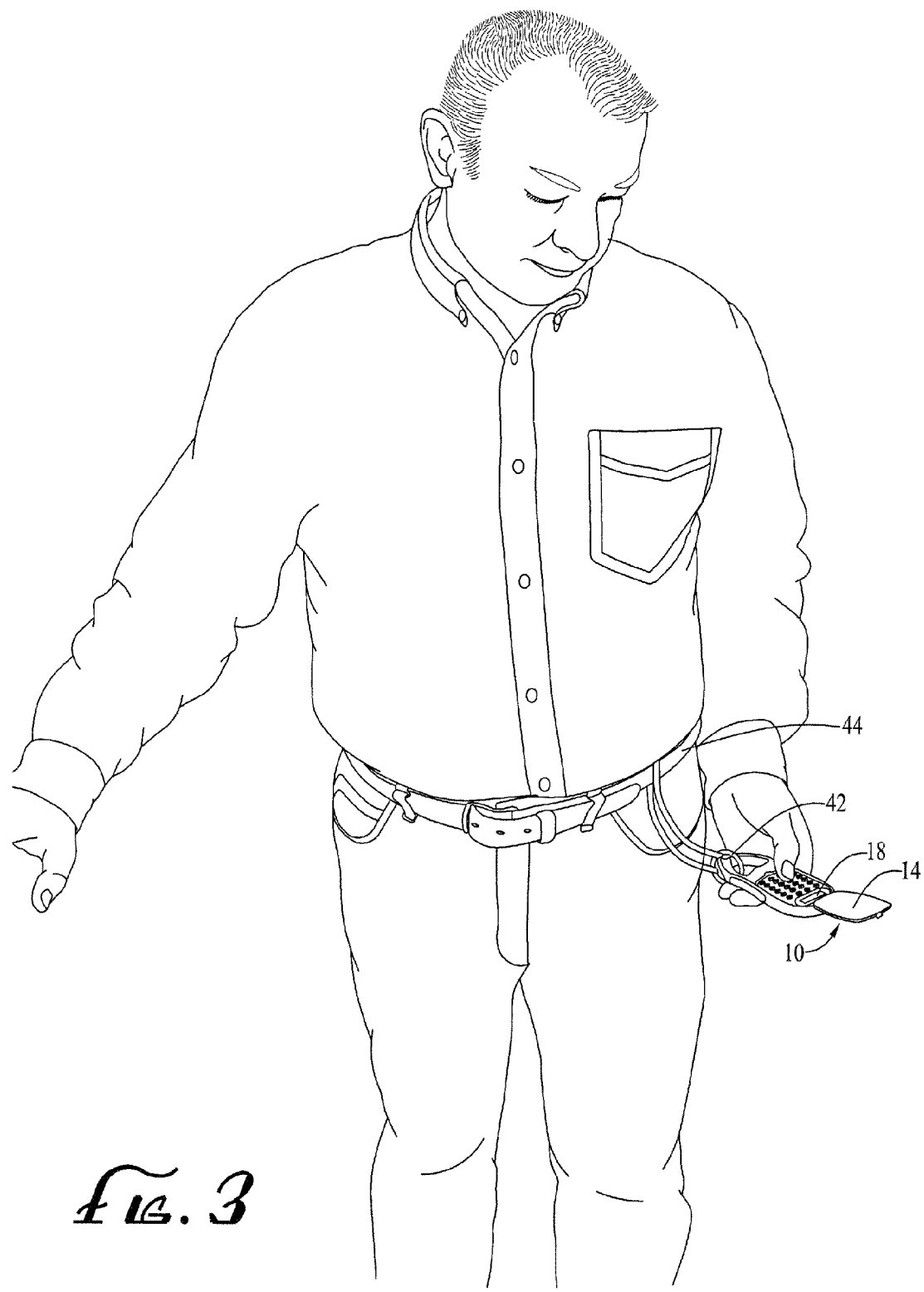
FIG. 3 is a perspective view of a person using the calculator of FIG. 1 while attached to an article on the user's person.

Referring now to the drawings which are presented merely for purposes of illustrating preferred embodiments of the present invention, and not for purposes of limiting the invention, a calculator 10 according to the present invention is shown. The calculator 10 includes a casing or housing 12, a cover 14, input elements 16, an output element 18, first and second grips 20 and 22, and a rotatable arm 24. The casing 12 has a top end 26 and a bottom end 28. The input elements 16 and the output element 18 are disposed in an inset portion 30 of the casing 12 between the top and bottom ends 26 and 28. Extending from the bottom end 28 is an enclosable, rigid loop or ring 32. The loop 32 includes a portion of the casing 12 as well as the arm 24. The loop 32 forms an enclosed opening 34 for receiving an article attached to a user of the calculator 10.

Figure 4:
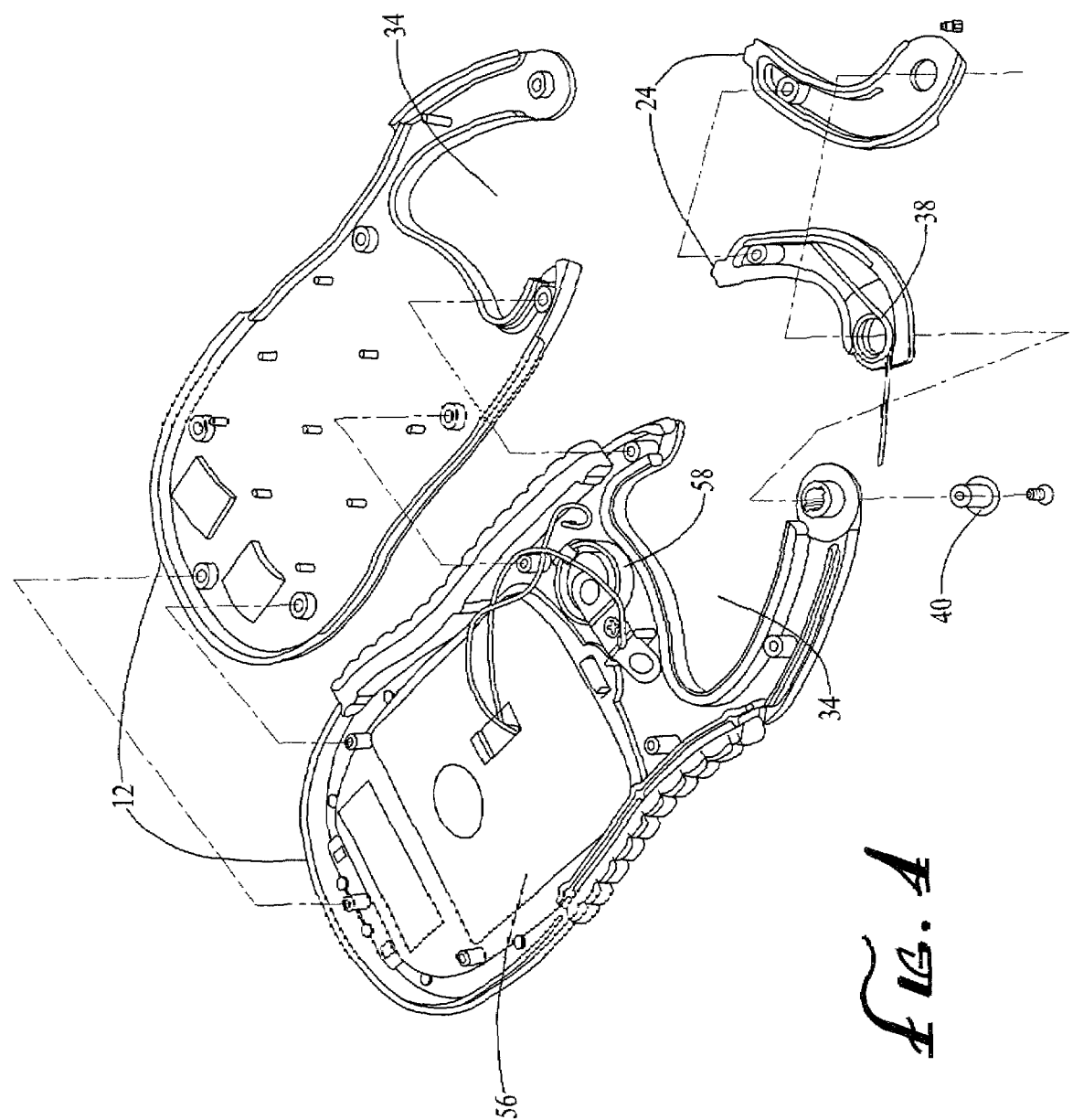
FIG. 4 is a partially disassembled view of the calculator of FIG. 1 with the upper and lower portions of the housing flipped over to reveal their inner structure.

Turning to FIG. 4, in addition to FIGS. 1 and 2, an attachment mechanism 36 includes the loop 32 (including the arm 24), a spring 38, and an arm pin 40. The loop 32 can be an oblong carabiner, as shown in FIGS. 1 and 2. The spring 38 and the arm pin 40 work together to bias the arm 24 to a closed position of the attachment mechanism 36. The closed position of the mechanism is illustrated in FIGS. 1 and 2. The arm 24 is rotatable about the longitudinal axis of the arm pin 40 to an open position (not shown) of the attachment mechanism 36. In the open position of the attachment mechanism 36, an article attached to the user of the calculator 10 such as a key ring 42 (shown in FIG. 3) can be passed through the loop 32. After the article 42 has passed through the loop 32, the key ring 42 and the loop 32 become interlocked because the arm 24 is biased to the closed position of the attachment mechanism 36. Articles other than the key ring 42, such as a key chain or the belt itself, can be used to attach the calculator 10 to a user of the device.

The casing 12, the arm 24, and the arm pin 40 can be made of a hard plastic material that is commonly used in calculators. The spring 38 can be made of steel or some other suitable metal.

As illustrated in FIG. 1, the input or command elements 16 can be buttons located in the inset portion 32. The buttons 16 have fixed alphanumeric characters and other input symbols on their faces. The input symbols can include the numerals zero through nine, the words "on" and "off," the mathematical operation symbols for addition, subtraction, multiplication and division, a decimal point, the square root sign, "MRC" to identify a clearing function, and other symbols useful for a calculator. Of course, the number and types of symbols used would depend on the sophistication and design purposes of the calculator.

In the drawings, the attachment mechanism 36 is the closest part of the calculator 10 to the user's body when the calculator is held by the user. This configuration places the input symbols in the right-side-up position when the calculator 10 is attached to the user. That way, the user can attach the calculator 10 to an article that is in turn attached to the user's clothing, such as a belt 44, and readily read the input symbols without detaching the calculator 10 from his or her person. FIG. 3 illustrates the foregoing. If the attachment mechanism 36 instead extended from the top end 26 of the calculator, the input symbols would be up-side-down for the user when the calculator is attached to the article. Therefore, the user would have to detach the calculator 10 to be able to easily read the input symbols.

Similar issues arise with respect to the output element 18 for displaying input information and the results of mathematical calculations. The output element 18 is also located in the inset portion 32 of the casing 12. The output element 18 depicted in the drawings is an electronic LCD (liquid crystal display), although other types of displays may be used. With the configuration of the present invention, the user can readily read the variable symbols on the output element display 18 in their right-side-up orientation, while the calculator 10 is attached to the user. In the prior art, the output display is not properly oriented in relation to the attachment mechanism 36 to permit easy reading of the display while the calculator is attached.

FIGS. 1 and 2 illustrate the cover 14 in open (FIG. 1) and closed (FIG. 2) positions. The cover 14 selectively covers (in the closed position) and exposes (in the open position) the input elements 18 and the output element 20. The cover 14 rotates about a longitudinal axis of a cover pin (not shown) between the open and closed positions. The cover pin is disposed inside a cover pin housing 46. The cover pin housing 46 includes a cover pin housing portion 48 which is integral with the cover 14, and a casing pin housing portion 50 which is integral with the casing 12. A latch 52 which is integral with the cover 14 fits into a notch 54 in the casing 12 to detachably lock the cover 14 in the closed position.

The input or command elements 16 and the output element 18 are electrically connected to electronic circuitry (not shown) for initiating and displaying mathematical calculations performed by the circuitry. The electronic circuitry is located between a circuitry protective plate 56 and the casing 12, as shown in FIG. 4. The power source for the circuitry can be a battery 58.

The calculator according to the present invention can be used to promote a business entity or its other products or services by placing the business entity's advertising indicia such as service mark(s), trademark(s), trade name(s) or logo(s) on surfaces of the calculator. A mark or name can be disposed on, or embedded in, a cover advertising surface 60 of the cover 14, as indicated by the designation "ABC" in FIG. 2. In addition, a mark or name can be disposed on or embedded in a casing advertising surface 62 of the casing 12, as indicated by the designation "XYZ" in FIGS. 1 and 2. Preferably, this indicia may be disposed in a right side-up orientation when viewed by an observer, or in a orientation that is opposite the orientation of input elements 16.

The present invention also includes a method of advertising using a device according to the invention. Such an advertising method includes the step of preparing a calculator according to the present invention. The term "preparing" is meant in a broad sense to include not only manufacturing but also acquiring from another source or selecting from available supplies.

A second step in the method of advertising could be placing advertising indicia on an external surface of the calculator so that the indicia are readily observable by persons in proximity to the device. The term "placing" is meant broadly to include not only physically putting the advertising indicia on the device's surface by, for example, imprinting, engraving, adhering, etc. the indicia. "Placing" also includes causing another person or company to place the indicia, or acquiring a device on which the advertising indicia were previously located.

One method of placing the advertising indicia could include the following sub-steps: (1) preparing a transparent advertising sheet; (2) disposing the advertising indicia between the transparent advertising sheet and the external surface of the container and holder; and (3) attaching the transparent sheet to the external surface, whereby the advertising indicia are displayed through the transparent sheet.

The present invention is capable of embodiments other than those described above, and its details are capable of modifications in various respects apparent to those of ordinary skill in the art, all without departing from the essential spirit or attributes of the invention. Therefore, the embodiments described hereinbefore should be considered to be merely illustrative, not restrictive.

What is claimed is:

1. A calculator attachable to an external article attached to a user of the calculator comprising:
   (a) a calculator casing having a top end and an opposing bottom end;
   (b) electronic circuitry disposed inside the casing for computing mathematical calculations;
   (c) input elements embedded in the casing between the top and bottom ends, the input elements being electrically connected to the circuitry for inputting instructions to the circuitry when activated, the input elements having fixed input symbols disposed thereon;
   (d) an output element embedded in the casing adjacent the input elements, the output element being electrically connected to the circuitry for displaying input information and the results of mathematical calculations, the output element being adapted to display variable output symbols thereon;
   (e) an enclosable, rigid loop extending from the bottom end, the loop having an attachment mechanism for selectively attaching the calculator to the external article; and
   wherein the input elements, the fixed and variable symbols, and the output element are collectively oriented in a right-side-up orientation such that the fixed and variable symbols are readable by the user when the calculator hangs from the external article.

2. The calculator of claim 1 wherein the input elements are buttons.

3. The calculator of claim 1 wherein the output element is an electronic display.

4. The calculator of claim 3 wherein the output element is an LCD display.

5. The calculator of claim 1 further comprising a battery as a power source.

6. The calculator of claim 1 wherein the loop is rigid.

7. The calculator of claim 6 wherein the loop is an oblong carabiner.

8. The calculator of claim 7 wherein the loop and the carabiner are integrally formed.

9. The calculator of claim 6 wherein the attachment mechanism includes an arm biased to form part of the loop for closing the attachment mechanism.

10. The calculator of claim 9 wherein the arm rotates about a pin attached to the loop to open and close the attachment mechanism.

11. The calculator of claim 1 wherein the external article is a key ring.

12. The calculator of claim 1 wherein the external article is a waist belt.

13. The calculator of claim 1 wherein the external article is a key chain.

14. The calculator of claim 1 further including a cover selectively covering the input elements.

15. The calculator of claim 14 wherein the cover is rotatably movable to open and closed positions.

16. The calculator of claim 14 further comprising advertising indicia on a surface of the cover.

17. The calculator of claim 1 further comprising advertising indicia on an advertising surface of the calculator casing.

18. A calculator attachable to an external article attached to a user of the calculator comprising:
    (a) a calculator section including command elements for sending instructions to the calculator to make mathematical calculations, the command elements having fixed input symbols thereon including the numerals one through ten for prompting user calculations, the input symbols having a right-side-up orientation permitting the symbols to be readily read by the user when the calculator is attached to the user; and
    (b) an attachment section including an enclosable, rigid ring disposed below the calculator section when the symbols are in the right-side-up orientation, the ring being part of an attachment mechanism for making the ring selectively attachable to the external article.

19. The calculator of claim 18 further comprising an output element on the casing adjacent the command elements, the output element being electrically connected to the circuitry for displaying input information and the results of mathematical calculations, the output element being adapted to display variable output symbols thereon that are disposed in the right-side-up orientation.

20. The calculator of claim 18 wherein the ring is an oblong carabiner.

21. The calculator of claim 18 wherein when the ring is attached to the article, the ring is interlocked therewith.

22. The calculator of claim 21 wherein a portion of the article passes through the ring adjacent the attachment mechanism when the ring is attached to the article.

23. The calculator of claim 18 further including a cover adapted to selectively cover and expose the command elements.

24. A calculator attachable to an external article attached to a user of the calculator comprising:
    a calculator casing having a top end and an opposing bottom end;
    electronic circuitry disposed inside the casing for computing mathematical calculations;
    an output element embedded in the casing, the output element being electrically connected to the circuitry for outputting the results of mathematical calculations, the output element being configured to display variable output symbols thereon;
    an enclosable, rigid loop extending from the bottom end, the loop having an attachment mechanism for selectively attaching the calculator to the external article; and
    wherein the output element is oriented in a right-side-up orientation such that the output symbols are readable by the user when the calculator is attached to the external article.

25. The calculator of claim 24 further comprising input elements embedded in the casing between the top and bottom ends, the input elements being electrically connected to the circuitry for inputting instructions to the circuitry when activated, the input elements having fixed input symbols disposed thereon in the right-side-up orientation.

26. A method of advertising comprising the steps of:
    (a) preparing a calculator attachable to an external article attached to a user of the calculator comprising:
        (1) a calculator casing having a top end and an opposing bottom end,
        (2) electronic circuitry disposed inside the casing for computing mathematical calculations,
        (3) input elements embedded in the casing between the top and bottom ends, the input elements being electrically connected to the circuitry for inputting instructions to the circuitry when activated, the input elements having fixed input symbols disposed thereon,
        (4) an output element embedded in the casing adjacent the input elements, the output element being electrically connected to the circuitry for displaying input information and the results of mathematical calculations, the output element being adapted to display variable output symbols thereon, and
        (5) an enclosable, rigid loop extending from the bottom end, the loop having an attachment mechanism for selectively attaching the calculator to the external article, wherein the input elements, the fixed and variable symbols, and the output element are collectively oriented in a right-side-up orientation such that the fixed and variable symbols are readable by the user when the calculator is attached to the external article; and
    (b) placing advertising indicia on an external advertising surface of the calculator so that the advertising indicia are readily observable by the user of the calculator.

27. The advertising method of claim 26 wherein step (b) comprises the steps of:
    (1) preparing a transparent advertising sheet;
    (2) disposing the advertising indicia between the transparent advertising sheet and the casing advertising surface; and
    (3) attaching the transparent sheet to the casing advertising surface, whereby the advertising indicia are displayed through the transparent sheet.

28. The advertising method of claim 26 wherein step (a) further comprises the step of:
    preparing the calculator with a cover selectively covering the input elements; and
    wherein in the step of placing advertising indicia the external surface is a cover surface of the cover.

29. The advertising method of claim 26 wherein the step (b) the external surface is a surface of the casing.

* * * * *